No. 743,900. PATENTED NOV. 10, 1903.
W. B. MAHAN.
CARPENTER'S FRAMING SQUARE.
APPLICATION FILED SEPT. 4, 1903.

NO MODEL. 2 SHEETS—SHEET 1.

Witnesses.
Julia Tarrent
Peter P. Jones.

Inventor.
WILLIAM B. MAHAN.
By Atty N. DuBois.

No. 743,900. PATENTED NOV. 10, 1903.
W. B. MAHAN.
CARPENTER'S FRAMING SQUARE.
APPLICATION FILED SEPT. 4, 1903.
NO MODEL. 2 SHEETS—SHEET 2.

Witnesses.
Julia Tarrent.
Peter P. Jones.

Inventor.
WILLIAM B. MAHAN.
By Atty N. DuBois.

No. 743,900. Patented November 10, 1903.

UNITED STATES PATENT OFFICE.

WILLIAM B. MAHAN, OF SPRINGFIELD, ILLINOIS, ASSIGNOR OF ONE-HALF TO HENRY M. GUSSWEIN, OF SPRINGFIELD, ILLINOIS.

CARPENTER'S FRAMING-SQUARE.

SPECIFICATION forming part of Letters Patent No. 743,900, dated November 10, 1903.

Application filed September 4, 1903. Serial No. 171,963. (No model.)

*To all whom it may concern:*

Be it known that I, WILLIAM B. MAHAN, a citizen of the United States, residing at Springfield, in the county of Sangamon and State of Illinois, have invented certain new and useful Improvements in Carpenters' Framing-Squares, of which the following is such a full, clear, and exact description as will enable others skilled in the art to which it appertains to make and use my said invention.

My invention relates to squares such as are used by carpenters, metal-workers, and other mechanics in laying out rafters for roofs or in laying out cornice-work or stairs or other similar structures.

The purposes of my invention are to provide in connection with the square a graduated scale indicating the "rise" of common rafters, the length of common rafters based on a twelve-inch run for all rises from one to eighteen inches, inclusive, the difference in length of common rafters and inclined rafters spaced sixteen inches between centers, and the difference in length of inclined rafters spaced two feet between centers; also, the length of octagon hip-rafters based on a thirteen-inch run for all rises from one to eighteen inches, inclusive, and the length of hip and valley rafters based on a seventeen-inch run for all rises from one to eighteen inches, inclusive; also, to provide in connection with the square a guide for marking plumb cuts, bottom cuts, and side cuts of common rafters, and to provide a guide for marking the side cuts for octagon hip-rafters and jacks all combined in one instrument.

With these ends in view my invention consists of the novel features of construction and combinations of parts shown in the annexed drawings, to which reference is hereby made, and hereinafter particularly described, and finally recited in the claims.

Figures 1, 2:
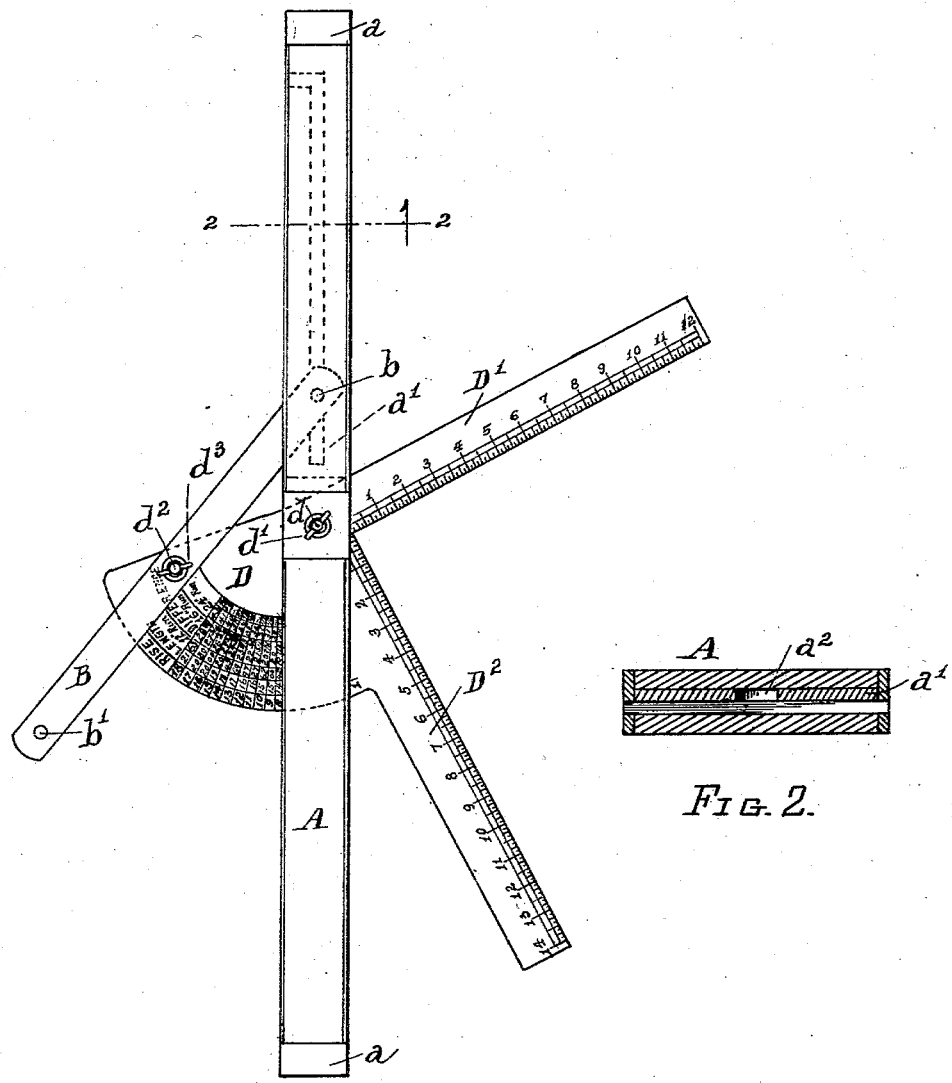
Figure 3:
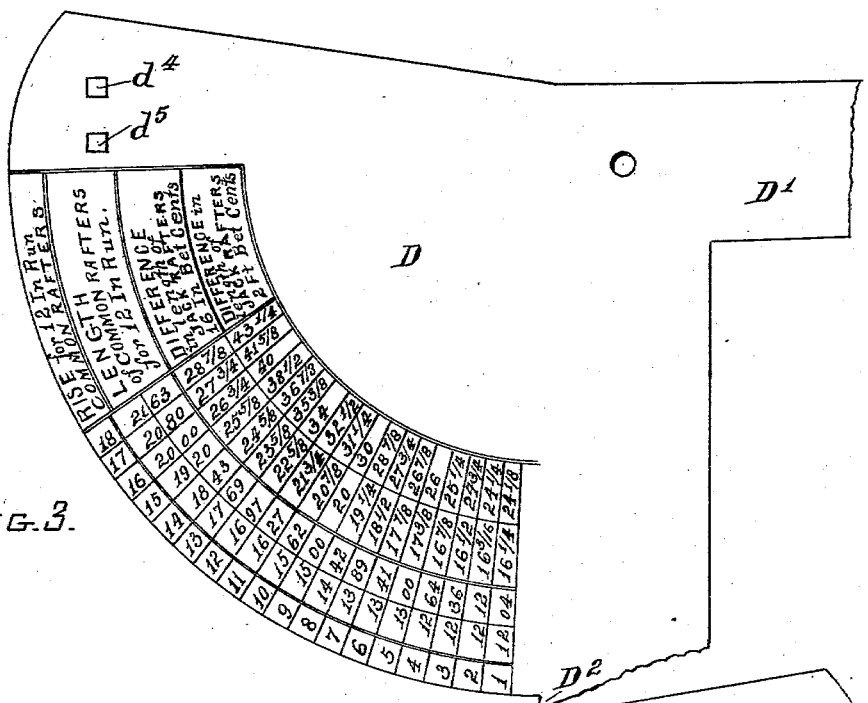
Figure 4:
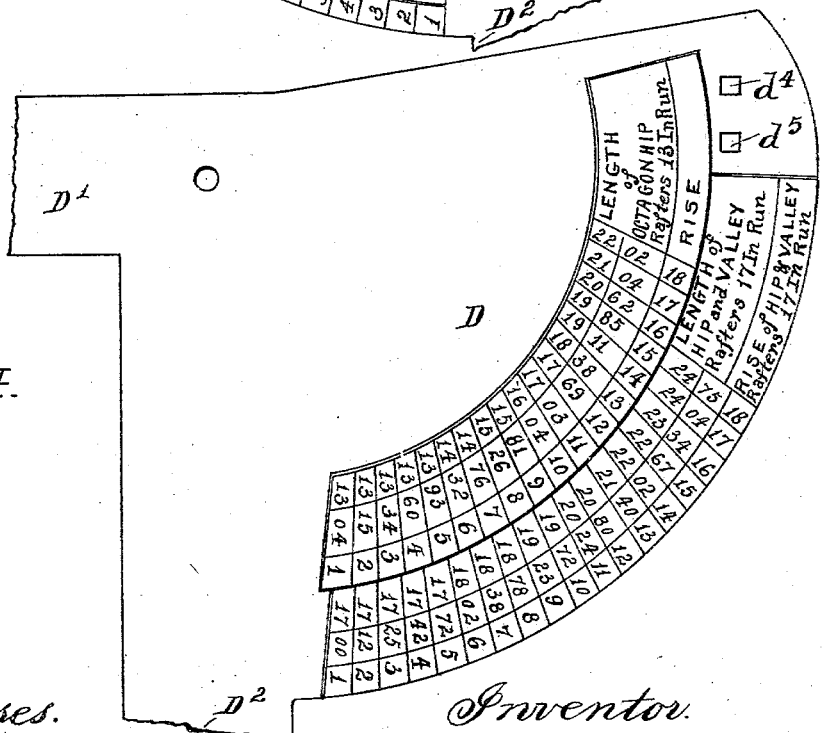

Referring to the drawings, Figure 1 is a top plan of the complete device. Fig. 2 is a vertical transverse section on line 2 2 of Fig. 1. Fig. 3 is an enlarged top plan of the graduated scale, and Fig. 4 is an enlarged bottom plan of the graduated scale.

Similar reference-letters designate like parts in the several views.

The frame A consists of two parallel side pieces having their ends strengthened by bands $a$ and spaced so that the blades may be turned between the side pieces. Between the side pieces is secured a metal strip $a'$, having a longitudinal way $a^2$, in which a pin $b$ on the blade B travels.

The scale-plate D, the plumb-cut blade D', and the bottom-cut blade $D^2$ form an integral plate pierced by a hole through which passes a bolt $d$, which connects the plate with the frame. The plate turns on the bolt, and a thumb-nut $d'$ on the bolt may be tightened to secure the plate in any desired position. The plate D is pierced by two squared holes $d^4$ and $d^5$. The hole $d^4$ is used in connecting the blade for marking common rafters, and the hole $d^5$ is used in connecting the blade for marking octagon hip-rafters, as hereinafter described. The plate D is connected with the blade B by a bolt $d^2$, having a thumb-nut $d^3$, which may be tightened to retain the parts in position. Near one end of the blade B is a hole $b'$, in which the bolt $d^2$ fits. The connection of the blade B with the scale-plate D may be changed by removing the bolt $d^2$ from the central hole in the blade and the hole $d^4$ of the plate and placing the blade on the plate D, so that the bolt $d^2$ will pass through the holes $d^5$ and $b'$. When the blade B is connected with the plate D by the bolt passing through the central hole in the blade, the blade is in such relation to the other parts that it may serve as a guide for marking the side cut for common hip-rafters, valley-rafters, and jacks, and when the blade is connected with the plate by the bolt passing through the hole $b'$ the blade is in such relation to the other parts that it may serve as a guide for the side cut of octagon hip-rafters and jacks.

The lower edge of the member D' serves as a guide for marking the plumb cut of the rafters, and the upper edge of the member $D^2$ serves as a guide for marking the bottom cut of rafters.

On the upper side of the plate D is inscribed a scale (illustrated in Fig. 3) showing in inches and hundredths of an inch the length of common rafters for each foot run based on a twelve-inch run for all rises from one to eighteen inches, inclusive, also showing the difference in length of common jacks spaced sixteen inches between centers for rises from one to eighteen inches, inclusive, and also showing the difference in length of jacks spaced two feet between centers for all rises from one to eighteen inches, inclusive. On the under side of the plate D is inscribed a scale showing in inches and hundredths of an inch the length of octagon hip-rafters based on a thirteen-inch run for all rises from one to eighteen inches, inclusive, and also showing the length of hip and valley rafters based on a seventeen-inch run for all rises from one to eighteen inches, inclusive. The dividing-lines of the graduations on the plate D are so arranged that when any one of the radial lines is in registry with the left-hand edge of the frame and the blade B is connected with the plate D by the bolt passing through the central hole in the blade the lower edge of the member D' will serve as a guide for marking the plumb cut of common rafters. The upper edge of the member $D^2$ will serve as a guide for marking the bottom cut of common rafters, and the upper edge of the blade B will serve as a guide for marking the side cut of jack-rafters and hip and valley rafters having the rise at which the plate is set. For example, if the plate is set with the rise marked "8" in registry with the left-hand edge of the frame, as shown in Fig. 1, the members D', $D^2$, and B will serve as guides for marking the plumb cut, the bottom cut, and the side cut, respectively. When the parts are in this position, it will be found by reference to the scale on the upper side of the plate that the length of a common rafter of eight-inch rise is 14.42 inches to the foot run and that the difference in length of a common jack is nineteen and one-fourth inches for sixteen-inch centers or is two feet four and seven-eighths inches for two-foot centers. If instead of common rafters or jacks it is desired to cut octagon hip or jack rafters, the connection of the blade B will be made by passing the bolt $d^2$ through the hole $b'$ in the blade and the hole $d^5$ in the plate and turning over the instrument, so as to bring into use the graduations on the under side of the plate D and then turning the plate D so that the number designating the desired rise will register with the right-hand edge of the frame as the instrument then lies and then, reading from the scale, the length of a rafter or jack or the length of a hip-rafter placed thirteen inches between centers corresponding to the rise at which the gage is set. For example, if the gage is set for an octagon hip-rafter of seven inches rise it will be found by reference to the scale that the proper length of a rafter of that rise is 14.76 inches for each foot run, or if the length of a hip or valley rafter is desired it will be found that the length of such a rafter of seven inches rise spaced seventeen inches between centers for each foot run is 18.78 inches. When the plate D is set in the desired position, the instrument is turned back to its original position and is placed with its right-hand edge along the edge of the rafter. The lower edge of the member D', the upper edge of the member $D^2$, and the upper edge of the blade B will then, respectively, serve as guides for marking the plumb cut, the bottom cut, and the side cut for an octagon hip-rafter or jack or a hip or valley rafter, as the case may be.

The pin $b$ on the blade B slides freely in the way $a^2$ and guides the upper end of the blade B, so that in whatever position the gage is set the upper edge of the blade B will serve as a guide for marking the side cut for common rafters or jacks or octagon rafters or jacks, according as the connection of the blade with the plate D is made by inserting the bolt $d^2$ in the central hole in the blade or inserting it in the hole $b'$ near the lower end of the blade and passing it through the hole $d^5$ in the plate D.

Having fully described my invention, what I claim as new, and desire to secure by Letters Patent, is—

1. In an instrument of the class described, a scale-plate having an integral plumb-cut member, and a bottom-cut member, and having on one side graduations showing the relative dimensions of parts for common rafters of different rises and runs, and having on the other side, graduations showing the relative dimensions of octagon rafters for different rises and runs, in combination with a main frame, a blade slidable on said main frame and having changeable connection with said scale-plate, as set forth.

2. In an instrument of the class described, the combination of parallel side pieces, a plate forming a longitudinal way between said side pieces, a scale-plate having a plumb-cut member and a bottom-cut member in a single integral structure, and turnable between said side pieces, means for securing said scale-plate, a blade having changeable connection with said plate and having a pin traversing the longitudinal way in the plate between said side pieces, as set forth.

In witness whereof I have hereunto subscribed my name, at Springfield, Illinois, this 15th day of August, 1903.

WILLIAM B. MAHAN.

Witnesses:
W. J. AURELIUS,
JESSIE NETTLETON.